2,960,626
Patented Nov. 15, 1960

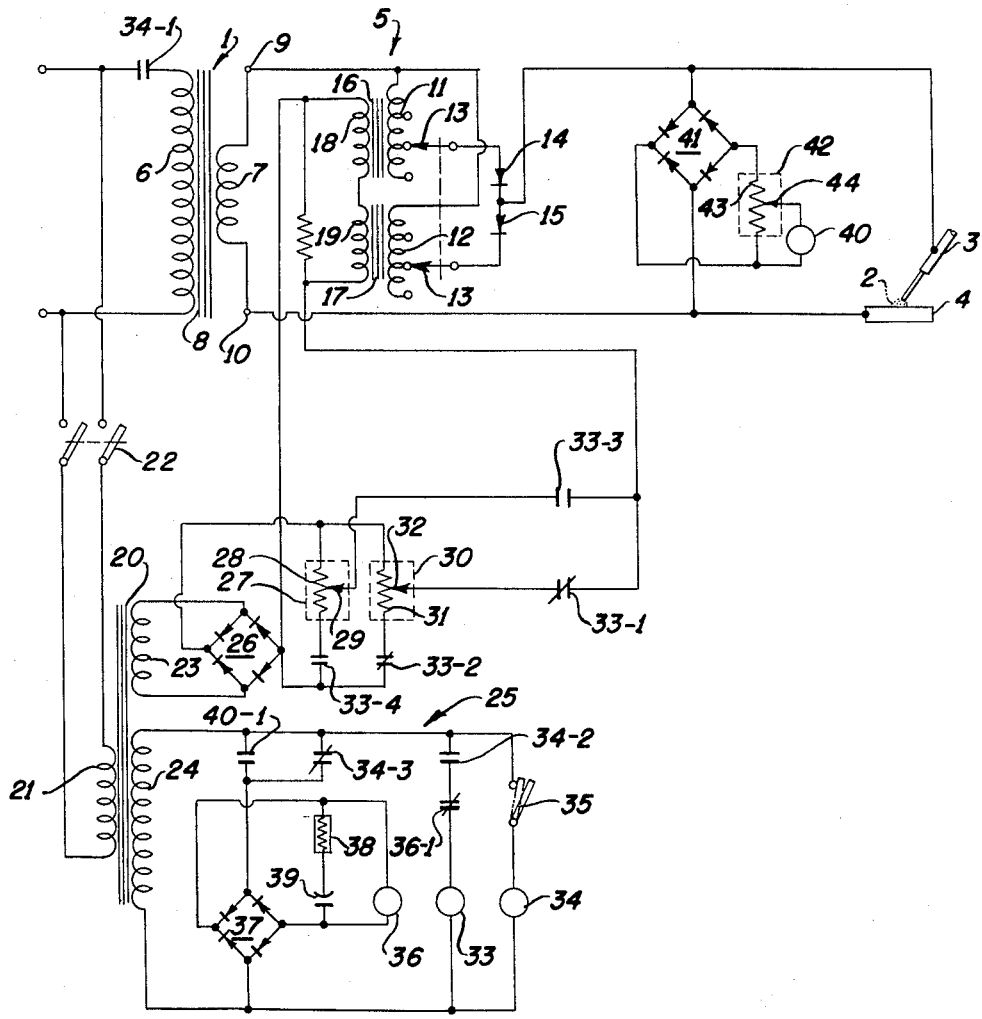

United States Patent Office

2,960,626
STARTING CONTROL FOR D.C. SATURATION CONTROLLED ARC WELDING APPARATUS

Allan C. Mulder, Appleton, Wis., assignor to Miller Electric Manufacturing Company, Appleton, Wis., a corporation of Wisconsin Filed June 18, 1959, Ser. No. 821,216

10 Claims. (Cl. 315—205)

This invention relates to a starting current control for arc welding apparatus having a saturable reactance current control and is particularly directed to an independent starting current control circuit for such arc welding apparatus.

Arc welding current supplies may employ a saturable reactance current control in the output circuit to regulate the value of current supplies to the arc. The saturable reactance control normally retards the rate at which the arc welding current initially builds to the final amplitude. As set forth in the co-pending application of Allan C. Mulder entitled "Saturable Core Control Means," filed January 23, 1958 and having Serial No. 710,755, this characteristic of saturable reactance control is a disadvantage in certain welding applications and generally, a controlled starting current rise is desirable in an arc welding supply.

The above application discloses and claims a control circuit for regulating the rate at which the current rises to the final value for welding. Through suitable switching and rheostat control, the operator is allowed to establish a very rapid rise or a very slow rise of initial current to the final welding current. Thus, when welding relatively light gauge metals, the operator may set the device for a slow start or initial rise in current. Where relatively heavy metals are being welded, the device can be regulated to establish a very fast start or initial rise in current. An automatic voltage responsive system is shown which returns the apparatus to a normal welding setting subsequent to the completion of the start sequence. This apparatus has found marked advantage in welding units which are required to weld various weight metals.

In prior apparatus no exact calibration of the starting current rise is provided and the actual value of the current is normally determined by a more or less trial and error method. The starting current control varies a voltage, dependent upon the setting for the final welding current. Consequently, the calibration of the start control means varies with the final welding output setting because of the interaction between the starting current circuit and the running current circuit at different welding current settings.

In accordance with the present invention, a starting current control is provided which allows independent presetting of the starting current and of the final welding current.

In accordance with the present invention, completely separate starting and running circuit controls are interposed between a suitable source of direct current (D.C.) and the saturating windings on the saturation control means. Suitable switching is provided to selectively and individually connect the starting circuit control and the running circuit control into operative circuit. Consequently, the starting current and the final welding current can be preset independently of each other and accurate and sensitive adjustment is obtainable.

The drawing furnished herewith illustrates the best mode presently contemplated for carrying out the invention.

The drawing is a schematic circuit diagram of a preferred embodiment of the invention in an alternating current welding unit having self-saturating D.C. saturation reactance control means in the output circuit.

Referring to the drawing, the illustrated welding apparatus includes a step-down transformer 1 which is adapted to supply alternating current to establish and maintain an alternating current arc 2 between an electrode 3 and a workpiece 4. The value of the welding current flowing through the arc 2 is preset through suitable actuation of a saturation reactance control 5 which is connected in the output circuit of the transformer 1.

The illustrated transformer 1 is a conventional single-phase type having a primary winding 6 which is adapted to be connected to a set of A.C. input power lines, not shown, such as the conventional 60 cycle distribution system. A secondary winding 7 is magnetically coupled to the primary winding 6 by a magnetic core 8, shown diagramatically.

The primary winding 6 and the secondary winding 7 are so arranged on the core 8 so as to establish a nearly constant potential output across the secondary winding 7. The opposite terminals 9 and 10 of secondary winding 7 are connected to the electrode 3 and the workpiece 4 to establish and maintain the arc 2.

The saturable reactance control 5 is connected in the line connecting the secondary terminal 9 to the electrode 3 in the illustrated embodiment of the invention.

The saturable reactance control 5 includes a pair of load current windings 11 and 12 which are connected in parallel with each other and in series with the transformer secondary 7 and the arc 2. A tapped connection 13 is made to each of the load current windings 11 and 12 to adjust the output welding current range.

A pair of rectifiers 14 and 15 are connected in series one with each of the respective windings 11 and 12 and are oppositely polarized such that the current flow in the paralleled load windings 11 and 12 is in opposite directions with respect to the arc 2. Rectifier 14 is connected in series with load current winding 11 and polarized to permit current flow to electrode 3. Rectifier 15 is connected in series with load current winding 12 and oppositely polarized to permit current flow from the electrode 3 to transformer 1. Consequently, the load current windings 11 and 12 carry the opposite half cycles of the alternating current flowing through the arc 2. Hereinafter, the positive half-cycle of alternating current flow is assumed to be from the electrode 3 to the work 4 and consequently the load winding 11 carries the positive half cycles of the current while the load winding 12 carries the negative half-cycles of current.

The windings 11 and 12 are individually wound on separate cores 16 and 17. The current flow in windings 11 and 12 is a pulsating direct current and consequently establishes an average premagnetization or saturation of the cores 16 and 17. A pair of series connected D.C. energized coils 18 and 19 are wound one on each of the cores 16 and 17. Energization of the D.C. coils 18 and 19 premagnetizes the cores 14 and consequently determines the reactance of the load current windings 11 and 12. The current supplied to the D.C. coils 18 and 19 is adjustable to provide control of the value of final welding current within each current range which is established by the movement of the tapped connections 13.

Direct current is supplied to the D.C. coils 18 and 19 in the illustrated embodiment of the invention as follows.

A control transformer 20 includes a primary 21 which is selectively connected by a manual switch 22 across the primary connecting leads to the primary 6 of the transformer 1. The control transformer 20 includes a first secondary 23 which is adapted to supply the power to the direct current coils 18 and 19 and a second secondary 24 which supplies power to a control circuit 25 as subsequently described.

The direct current circuit for windings 18 and 19 includes a full wave rectifier 26 which has its input terminals connected across the secondary 23 of the control transformer 20. The full wave rectifier 26 is diagrammatically shown as a conventional full wave bridge type rectifier and no further description is therefore given.

A final welding current potentiometer 27 includes a winding 28 which is connected across the output of the rectifier 26. Potentiometer 27 includes a movable tap 29 on the winding 28 which is connected in series with one side of the series-connected direct current saturating coils 18 and 19. The opposite side of the series connected direct current coils 18 and 19 is connected directly to the electrically low side of the rectifier 26 and the potentiometer 27. Tap 29 is positioned to vary the voltage impressed across the D.C. control coils 18 and 19. The current through the coils 18 and 19 is in proportion to the impressed voltage and consequently, the movement of the tap 29 varies the direct current flow in the coils 18 and 19.

A starting current control potentiometer 30 includes a winding 31 which is connected to the output of rectifier 26 in parallel with the final welding current potentiometer winding 28. A tap 32 of the potentiometer 30 is connected in parallel with the final welding current tap 29 and in series with the direct current coils 18 and 19.

A potentiometer connection relay 33 simultaneously controls four sets of relay contacts 33–1, 33–2, 33–3 and 33–4 which are connected in the circuit of the potentiometers 27 and 30.

The relay contacts 33–1 are normally closed contacts and are connected in series with the movable tap 32 of the start potentiometer 30. The relay contacts 33–2 are normally closed contacts and are connected in series with the winding 31 of potentiometer 30 across rectifier 26. Consequently, the starting current control potentiometer 30 is connected in circuit with the rectifier 26 and the saturation control coils 18 and 19 whenever control relay 33 is de-energized.

The relay contacts 33–3 are normally open contacts and are connected in series with tap 29 of potentiometer 27. The relay contacts 33–4 are normally open contacts and are connected in series with winding 28 of the potentiometer 27 across the rectifier 26. Consequently, the final welding current potentiometer 27 is disconnected from the circuit whenever the relay 33 is de-energized. Each of the individual potentiometers 27 and 30 generally function in the same basic manner to individually and separately adjust the D.C. current to the D.C. coils 18 and 19. The starting current and the welding current are thus individually and separately controlled by corresponding control of the reactance of the load windings 11 and 12.

The selective connection of the potentiometers 27 and 30 into operative circuit with the D.C. coils 18 and 19 is automatically established by relay 33 in response to the condition of the output circuit in the illustrated embodiment of the invention as follows.

A main contactor relay 34 is connected in series with a manual switch 35 across the secondary 24 of the control transformers 20. The relay 34 controls three sets of associated contacts 34–1, 34–2 and 34–3. Relay contacts 34–1 are normally open contacts and are connected in one of the incoming power leads to the primary 6 of the main welding transformer 1. Consequently, when the control switch 35 is disposed to the closed position, as shown in phantom in the drawing to energize relay 34, the welding contacts 34–1 close and supply power to the main transformer 1. The transformer 1 reduces the incoming voltage to a suitable value for arc welding and power is thus supplied to the arc 2.

The starting current potentiometer 30 is presently operatively connected in the circuit and consequently controls the magnitude of the starting welding current independently of the final magnitude of the welding current.

The second set of relay contacts 34–2 are normally open contacts and are connected in series with the potentiometer control relay 33 across the secondary 24 of the control transformer 20. The contacts 34–2 prevent energization of the relay 33 until the main contactor relay 34 is energized and power supplied to the transformer 1.

A set of normally closed contacts 36–1 of an output controlled relay 36 are connected in series circuit with the potentiometer control relay 33 and the normally open main contactor relay contacts 34–2. The output controlled relay contacts 36–1 are opened prior to or incident to the closing of the control switch 35 and energization of coil 34 to prevent energization of the potentiometer control relay 33 during the initial rise of the welding current, in the following manner.

A third set of normally closed contacts 34–3 of the main contactor relay 34 are connected in series circuit with the input terminals of a full wave rectifier 37 across the secondary 24 of the control transformer 20. The output controlled relay 36 is connected across the output of the full wave rectifier 37. Consequently, immediately upon energization of the control transformer 20 by the closing of the control switch 22, power flows through the normally closed contacts 34–3 and the rectifier 37 to apply an energizing voltage to the output controlled relay 36. The relay 36 then opens the contacts 36–1 and prevents energization of the potentiometer control relay 33.

A resistance 38 and capacitor 39 are connected in series with each other and in parallel with the relay 36. When current is applied to the relay 36, the capacitor 39 is charged. Consequently, when the circuit to the relay 36 is opened by disconnection of the rectifier 37 from the transformer 20, the capacitor 39 discharges through the relay 36 and maintains relay 36 for a predetermined short period of time. The time delay employed is adjusted by suitable selection of resistor 38 and capacitor 39 to prevent dropping out of the relay 36 during switching which occurs immediately upon striking of the arc.

An output sensing relay 40 is connected to respond to the voltage across the arc 2. Relay 40 controls a set of normally opened contacts 40–1 which are connected in parallel with the normally closed main contactor relay contacts 34–3. Consequently, when the main contactor relay 34 is energized to close the first set of relay contacts 34–1, power is applied across the electrode 3 and work 4 and to the output sensing relay 40. The output sensing relay 40 closes the normally open contacts 40–1 which completes the circuit to rectifier 37 and the output controlled relay 36 independent of the main contactor relay contacts 34–3. The latter relays contacts 34–3 open upon the closing of the main contactor switch 35 and the consequent energization of the main contactor relay 34. The previously described time delay in the de-energization of the relay 36 as a result of the charged capacitor 39 establishes the required time for switching and closing of the output sensing relay contacts 40–1 without a resultant de-energization of relay 36 and the closing of the relay contacts 36–1. Consequently, the potentiometer controlled relay 33 is maintained de-energized and the starting control potentiometer 30 is connected in circuit with the D.C. saturating coils 18 and 19 to control the starting current.

The output sensing relay 40 is connected in the output circuit of the welding transformer to respond to the voltage appearing across the arc 2 in the following manner.

A full wave rectifier 41 has the opposite input terminals connected respectively to the electrode 3 and the workpiece 4. The open circuit voltage is applied to the rectifier 41 prior to striking of the arc 2 and the same voltage as appears across the arc 2 is applied to the rectifier 41 when an arc is struck. A sensitivity adjustment potentiometer 42 includes a winding 43 which is connected across the output of the rectifier 41. The sensing relay 40 is adjustably connected across the potentiometer winding 43 by a potentiometer tap 44. The potentiometer 42 is manually adjusted to apply a proportion of the voltage appearing across the electrode 3 and the workpiece 4 across the sensing relay 40.

The relay 40 is constructed such that the open circuit voltage of transformer 1 energizes the relay 40 sufficiently to close the associated relay contacts 40–1. Consequently, on open circuit condition the output controlled relay 36 is maintained energized. However, when an arc 2 is struck, the voltage across the arc rapidly decreases and the voltage appearing across the rectifier 41 and relay 40 decreases accordingly. At a preselected decrease voltage the relay 40 drops out and opens the relay contacts 40–1 breaking the circuit to the relay 36. As the main contactor relay 34 is energized, the main contactor contacts 34–3 are open and power is removed from the output controlled relay 36 following a short momentary period during which the capacitor 39 discharges through the relay 36.

The relay contacts 36–1 then close and complete the circuit to the potentiometer control relay 33. Completion of the circuit through the relay 33 opens the associated relay contacts 33–1 and 33–2 and disconnects the start potentiometer 30 from the circuit to the D.C. coils 18 and 19. Simultaneously the relay contacts 33–3 and 33–4 of the welding current potentiometer 27 are closed and connect the potentiometer 27 in the circuit with the D.C. saturating coils 18 and 19. The saturation is then automatically established to maintain a predetermined welding current.

The operation of the illustrated embodiment of the invention is summarized as follows.

Assume the electrode 3 and the workpiece 4 are connected across the secondary 7 of the transformer 1 in series with the saturation control unit 5. The control switch 22 is moved to the closed position connecting the controlled transformer 20 across the incoming power lines. The main contactor switch 35 is in the open position.

The main contactor relay contacts 34–1 are open and the primary 6 of transformer 1 is disconnected from the incoming power source, not shown. Consequently, no voltage appears across the electrode 3 and the workpiece 4 or across the rectifier 41. The sensing relay 40 is consequently de-energized and the corresponding relay contacts 40–1 are open. However, the main contactor relay contacts 34–3 are closed and in cooperation with the rectifier 37 supply direct current power to the output controlled relay 36. The relay 36 is thus energized and maintains the contacts 36–1 open. Simultaneously, the capacitor 39 is charged to a voltage corresponding to the voltage appearing across the secondary 24 of the control transformer 20. The circuit to the potentiometer control relay 33 is therefore maintained open by both the output controlled relay contacts 36–1 and the main contactor relay contacts 34–2. The relay contacts 33–1 through 33–4 are in the de-energized position and the starting current control potentiometer 30 is connected across the D.C. rectifier 26 and the D.C. saturating coils 18 and 19 while the welding current potentiometer 27 is disconnected from the corresponding circuits. The apparatus is then in a standby position.

Assume the operator now closes the switch 35 and connects the main contactor relay 34 across the secondary 24 of transformer 20. The relay 34 is energized and closes the normally open contacts 34–1 to complete the circuit connection of the primary winding 6 of transformer 1 to the incoming power source, not shown. Power is thus applied to the transformer 1 which reduces the incoming voltage to a suitable voltage for arc welding. The open circuit voltage is applied directly across the electrode 3 and the work 4. A portion of the voltage also is applied to the sensing relay 40 and energizes the relay 40 sufficiently to effect closing of the relay contact 40–1.

The normally open main contactor relay contacts 34–2 close to condition the potentiometer controlled relay 33 for energization. However, relay 33 is maintained de-energized by the contacts 36–1 which are opened in response to energization of relay 36 as previously described.

The normally closed contacts 34–3 of the main contactor relay 34 open incident to energization of relay 34 and break the circuit therethrough to the control rectifier 37 and the output control relay 36.

However, the relay 36 is maintained energized through the sensing relay contacts 40–1 which are closed approximately simultaneously with the energization of the transformer 1.

A momentary period may be established during which both sets of contacts 34–3 and 40–1 are open as previously described. Consequently, there is a momentary period when the output controlled relay 36 is not supplied with power from the output controlled transformer 20. However, the charge on the capacitor 39 discharges through the relay 36 and the resistance 38 to maintain energization of the relay 36 during this momentary period. The output controlled relay contacts 36–1 are maintained in an open condition and the potentiometer controlled relay 33 remains de-energized until the relay output sensing contacts 40–1 open for a predetermined period longer than that taken for the discharge of the capacitor 39.

The relay contacts 33–1 through 33–4 remain in the initial or de-energized position and connect the starting potentiometer 30 in a completed circuit with the rectifier 26 and the saturating coils 18 and 19.

The potentiometer 30 is adjusted by suitable positioning of tap 32 upon winding 31 to establish a preselected current value during the starting portion which is independent of the normal welding control. If tap 32 is positioned to apply the entire saturating voltage across the coils 18 and 19, the iron cores 16 and 17 are saturated and approach the characteristic of air cores. The reactance of coils 11 and 12 are therefore at a minimum and the welding current rapidly rises to a preselected starting current.

If potentiometer 30 is oppositely adjusted to apply a small or no voltage to coils 18 and 19, the iron cores are free to carry large values of alternating flux. Consequently, coils 11 and 12 have a maximum reactance and the current is established at a low value during the starting cycle or portion. This establishes a soft start particularly suitable for very light gauge metals.

By suitable intermediate positioning of tap 32, the starting current is readily adjusted for the type of metal being fabricated.

As the amplitude of welding current increases a voltage drop is developed across the reactance control unit 5 and the voltage drop across the arc 2 decreases. The voltage across the sensing relay 40 decreases in proportion to the drop across the arc 2. At a predetermined decreased voltage level the current through the sensing relay 40 is insufficient to hold the contacts 40–1 closed and the contacts drop out. The exact value at which the contacts 40–1 open is determined by the setting of the adjustment potentiometer 42.

When the relay contacts 40–1 open, the circuit to the output control relay 36 is broken. The relay 36 remains energized for a momentary period during which the capacitor 39 discharges. Thereafter, the relay 36 is de-energized and the relay contacts 36–1 which are in series with relay contacts 34–2 and potentiometer relay 33 revert to the normally closed position.

The main contactor relay contacts 34–2 are closed as a result of the energization of the main contactor relay 34 and the circuit to the potentiometer control relay 33 is now completed.

The contacts 33-1 and 33-2 of potentiometer control relay 33 open and disconnect the starting potentiometer 30 from circuit with the D.C. saturating coils 18 and 19. Simultaneously, the normally open contacts 33-3 and 33-4 of relay 33 close and connect the welding current potentiometer 27 in circuit with the saturating coils 18 and 19.

The welding current potentiometer 27 is maintained in circuit until the arc 2 is broken and the voltage appearing across the arc rises sufficiently to energize the sensing relay 40 or the main switch 35 is opened to deenergize main contactor relay 34.

The potentiometer 27 is adjusted to saturate the cores 16 and 17 and establish a predetermined arc welding current. The final current may be larger, smaller or equal to the starting current.

If the arc 2 is broken, the voltage across the electrode 3 and workpiece 4 and across the sensing relay 40 rises rapidly. The sensing relay contacts 40-1 close and again apply current to the output current relay 36. The associated contacts 36-1 open and break the circuit to the potentiometer control relay 33. The various potentiometer relay contacts 33-1 through 33-4 revert to the normal deenergized position disconnecting the welding current potentiometer 27 and reconnecting the starting potentiometer 30 in the saturating circuit previously described.

If the main contactor relay 34 is de-energized for any reason, the associated contacts 34-2 open and break the circuit to the potentiometer relay 33. The relay contacts 33-1 through 33-4 revert to the de-energized position and the apparatus is also in standby welding position.

The use of the separate welding current control and the starting current control allows entirely independent settings of the starting welding current and the final welding current desired. This permits precise and accurate control of the starting current in accordance with the type of welding to be done.

The present invention provides a simple reliable arc welding start control for saturation controlled arc welding apparatus.

Various embodiments of the present invention are contemplated within the scope of the following claims which particularly and distinctly point out the subject matter which is regarded as the invention.

I claim:

1. In an arc welding machine having a saturable reactance control including saturation winding means adapted to be connected to a suitable source of control current, a first variable direct current source, a second variable direct current source, and circuit connecting means to selectively and individually connect said first variable direct current source and disconnect said second direct current source to said saturation winding means during a predetermined arc establishment period and to disconnect said first variable direct current source and connect said second direct current source to said saturation winding means at the end of the arc establishment period to allow independent establishment of the current supplied to the saturation winding means.

2. In an arc welding machine having a saturable reactance control including saturation winding means adapted to be connected to a suitable source of control current, a starting current control circuit including current adjusting means to supply an adjustable control current to the saturation winding means, a final current control circuit including current adjusting means to supply an adjustable control current to the saturation winding means, and circuit connecting means connected to said source of control current and adapted to selectively and individually connect said starting control current circuit and disconnect said final current control circuit to said saturation winding during a predetermined arc establishment period and to disconnect said starting control current circuit and connect said final current control circuit to said saturation winding at the end of the arc establishment period.

3. In an arc welding machine having a saturable reactance control including saturation winding means adapted to be connected to a suitable source of control current to vary the welding current supplied to an arc established between welding electrodes, a starting current control circuit including current adjusting means, a final current control circuit including current adjusting means, and circuit connecting means responsive to the voltage across the welding electrodes and adapted to selectively and individually connect said starting control current circuit and disconnect said final current control circuit to said saturation winding means and said source of control current during a predetermined arc establishment period and to reverse the connection of the starting control current circuit and the final current control circuit incident to pre-determined changes in said voltage.

4. In an arc welding machine adapted to be connected to an incoming power source and having a saturable reactance control including saturation winding means adapted to be connected to a suitable source of control current, a starting current control circuit including current adjusting means, a final current control circuit including current adjusting means, circuit connecting means adapted to selectively and individually connect said starting control current circuit and said final current control circuit to said saturation winding and said source of control current, said circuit connecting means having a non-welding position connecting the starting current control circuit and disconnecting said final current control circuit to said saturation windings and having a welding position reversing the connection of said starting current control circuit and said final current control circuit, electric control means for actuating said circuit connecting means, means to simultaneously complete the connection to the incoming power source of establish an output voltage suitable for arc welding and to actuate said electric control means, and means responsive to the output from said welding machine and interlocked with said last-named means to prevent actuation of said electric control means for a preselected initial period of power output.

5. In an arc welding machine having a saturable reatcance control including saturation winding means adapted to be connected to a suitable source of control current, a first potentiometer interposed between said source of control current and said saturation winding means, a second potentiometer connected in parallel circuit with said first potentiometer, and circuit connecting means in said parallel circuit to selectively connect said first potentiometer in circuit and disconnect said second potentiometer from circuit for a preselected initial period of power output and to disconnect said first potentiometer from and connect said second potentiometer in circuit subsequent to said preselected initial period.

6. In an arc welding machine having a saturable reactance control in the output circuit including saturation winding means adapted to be connected to a suitable source of control current, a starting current control circuit including current adjusting means, a final current control circuit including current adjusting means, circuit connecting means adapted to selectively and individually connect said starting control current circuit and said final current control circuit to said saturation windings and said source of control current, electric control means adapted to actuate said circuit connecting means, means to control establishment of the output circuit of the arc welding machine and to actuate said electric control means, and means responsive to the output power and interlocked with said last named means to prevent actuation of said electric control means for a preselected initial period of power output.

7. In an arc welding machine having a saturable reactance control including saturation winding means adapted to be connected to a suitable source of control current, a first potentiometer interposed between said source of control current and said saturation winding means, a second potentiometer connected in parallel circuit with said first potentiometer, a control relay having contacts alternatively connecting said first and second potentiometers in circuit, a main relay having contacts in circuit with said control relay, and an output controlled relay having contacts in circuit with said control relay and the contacts of said main relay to establish dependent control of control relay.

8. In an arc welding machine having a saturable reactance control including saturation winding means adapted to be connected to a suitable source of control current, a first potentiometer having a winding connected across said source of control current and a movable tap selectively connecting said winding across the saturation winding means, a second potentiometer having a winding connected in parallel circuit with said first potentiometer winding and having a tap selectively connecting said second potentiometer winding across the saturation winding means, and circuit switching means in series with said parallel connected potentiometer windings and in series with said potentiometer taps, said switching means being oppositely conditioned, and switch actuating means responsive to the output of the welding machine to operate said switching means to selectively connect said first potentiometer and disconnect said second potentiometer for a preselected initial period of power output and to disconnect said first potentiometer and connect said second potentiometer subsequent to said preselected initial period.

9. In an arc welding machine having a saturable reactance control in the output circuit including saturation winding means adapted to be connected to a suitable source of control current, a first potentiometer interposed between said source of control current and said saturation winding means, a second potentiometer connected in parallel circuit with said first potentiometer, circuit connecting means in said parallel circuit to selectively connect said potentiometer and disconnect said second potentiometer for a preselected initial period of power output from the welding machine and to disconnect said first potentiometer and connect said second potentiometer subsequent to said preselected initial period, electromagnetic means having contact means selectively connecting the welding machine to an incoming power source, an output controlled relay controlling said circuit connecting means, a sensing relay connected across the output of the welding machine and having sensing relay contacts actuated in response to a predetermined minimum voltage across the sensing relay, said sensing relay contacts being connected in circuit with said output controlled relay to control the energization of the output controlled relay, second contacts on said main relay connected to control the energization of the output controlled relay independently of said sensing relay, and time delay means to maintain energization of the output controlled relay for a predetermined period corresponding at least to the time between actuation of the main relay contacts and the sensing relay contacts.

10. In an arc welding machine adapted to be connected to an incoming power source to establish an arc between a pair of electrodes and having a saturable reactance control including saturation winding means adapted to be connected to a suitable source of control current, a first potentiometer interposed between said source of control current and said saturation winding means, a second potentiometer connected in parallel circuit with said first potentiometer, circuit connecting means in said parallel circuit to selectively connect said potentiometer and disconnect said second potentiometer for a preselected initial period of power output and to disconnect said first potentiometer and connect said second potentiometer subsequent to said preselected initial period, a main relay means having contact means to selectively connect the welding machine to the incoming power source, an output controlled relay controlling the circuit connecting means, a sensing relay connected across the output of the welding machine and having sensing relay contacts actuated in response to a predetermined minimum voltage across the sensing relay greater than the voltage appearing across the electrodes in the presence of an arc, said sensing relay contacts being connected in a series circuit with said output controlled relay to control the energization of the output controlled relay, second contacts on said main relay connected in parallel with said sensing relay contacts and in series with said output controlled relay to control the energization of the output controlled relay independently of said sensing relay, and time delay means to maintain energization of the output controlled relay for a predetermined period corresponding at least to the time between actuation of the second contacts of the main relay and the contacts of the sensing relay.

References Cited in the file of this patent

UNITED STATES PATENTS

| | | |
|---|---|---|
| 2,365,611 | White | Dec. 19, 1944 |
| 2,770,738 | Vance | Nov. 13, 1956 |
| 2,807,754 | Steinitz | Sept. 24, 1957 |
| 2,880,374 | Mulder | Mar. 31, 1959 |
| 2,880,375 | Cresswell | Mar. 31, 1959 |